US005687087A

United States Patent [19]

Taggart

[11] Patent Number: 5,687,087

[45] Date of Patent: Nov. 11, 1997

[54] CARD PRINTING AND DISPENSING SYSTEM

[76] Inventor: Peter Taggart, 3204 Jordan Grove, West Des Moines, Iowa 50265

[21] Appl. No.: 471,374

[22] Filed: Jun. 6, 1995

[51] Int. Cl.[6] ..... G06F 17/00

[52] U.S. Cl. ..... 364/479.03; 364/479.01; 364/479.02; 235/381

[58] Field of Search ..... 364/479, 401, 364/468, 479.01, 479.02, 479.03, 479.05, 479.06, 468.01, 468.02, 468.03, 468.24, 188, 402, 403; 395/117, 226, 227; 235/381; 902/30, 32; 273/244, 244.1, 244.2

[56] References Cited

U.S. PATENT DOCUMENTS

| | | | |
|---|---|---|---|
| 4,359,631 | 11/1982 | Lockwood et al. | 235/381 |
| 5,036,472 | 7/1991 | Buckley et al. | 364/479 |
| 5,056,029 | 10/1991 | Cannon | 364/468 |
| 5,132,915 | 7/1992 | Goodman | 364/479 |
| 5,235,519 | 8/1993 | Miura | 364/479 |
| 5,239,480 | 8/1993 | Huegel | 364/479 |
| 5,305,197 | 4/1994 | Axler et al. | 364/401 |
| 5,408,417 | 4/1995 | Wilder | 364/479 |
| 5,442,567 | 8/1995 | Small | 364/479 |
| 5,459,819 | 10/1995 | Watkins et al. | 395/117 |
| 5,513,116 | 4/1996 | Buckley et al. | 364/479 |

*Primary Examiner*—Reba I. Elmore
*Assistant Examiner*—Thomas E. Brown
*Attorney, Agent, or Firm*—Kent A. Herink; Brian J. Laurenzo; Michael C. Gilchrist

[57] ABSTRACT

A card printing and dispensing system located at the venue of an ongoing or recently completed entertainment event and including a video display monitor, a customer interface, a printer, and a computer control. A customer interested in purchasing a card selects using the customer interface from a variety of options displayed on the video monitor a desired card unique to the particular ongoing or recently completed entertainment event for printing and dispensing by the system. The system is particularly suited to printing and dispensing unique baseball cards which would include information corresponding to an individual game or series of games and available only at the venue where the individual game or series of games were actually played.

27 Claims, 5 Drawing Sheets

CARD PRINTING AND DISPENSING SYSTEM

BACKGROUND OF THE INVENTION

1. Field of the Invention

The invention relates to printing and dispensing devices and, more specifically, to a self-service card printing and dispensing device, particularly a printing and dispensing device for souvenir sports cards.

2. Background of the Prior Art

Souvenir sports cards have long been a popular part of the enjoyment of sports, including all professional sports and particularly including baseball. In recent times, the revenues generated by souvenir sports cards has reached a level where it is a significant part of the salaries of many players and of the income of team owners. Further, an enormous secondary market in the "trading" of souvenir sports cards has arisen and is thriving.

Souvenir sports cards have traditionally been pre-printed cards that display a picture of a player or team and statistics and other information regarding the player or team. The cards are usually issued in series that cover a significant time period such as a season or a career. The series of cards are printed in a central location and distributed through retail souvenir shops and other conventional channels, including packaging the cards with other products, such as chewing gum. While souvenir sports cards have been modified over the years to take advantage of technological improvements in mainly printing processes and techniques, the nature of the information included on the cards has not changed substantially since the very earliest cards. Further, the methods of distribution to customers also has not changed substantially since their introduction.

SUMMARY OF THE INVENTION

The invention consists of a sports card printing and dispensing device which is operable by a customer of the sports cards to print and dispense a souvenir sports card that displays current, up-to-the-minute information regarding a sporting event, player, or team. The apparatus consists of a portable kiosk or printing and dispensing machine that may be conveniently placed at the site of a sporting event, such as a baseball stadium. The printing and dispensing machine is stocked with an inventory of blank cards, one side of which in a preferred embodiment has been pre-printed with images, designs, or both, that are unique to the home team and the sporting venue where the dispensing machine is located. The machine is controlled through a customer interface, such as a keypad or touch screen, and information regarding the transaction is displayed to the customer on a video monitor. Commands from the customer interface are received by a computer that interacts with the customer through the video monitor and the customer interface to provide the customer with information and displays regarding the options of souvenir sports cards available from the machine. Upon completion of the selection of available options, the computer directs the printing of a souvenir sports card that is dispensed to the customer.

The computer includes a modem whereby the machine is in communication with a central database of sports card information or a local sports information database specific to the location of the particular dispensing machine, or both. Existing services provide databases which are updated on an almost continuous basis to provide nearly real-time access to sports statistics as the games are being played. The customer, accordingly, can choose to have printed and dispensed a souvenir sports card that contains information specific to not only a particular player or team but also to a particular game or series of games in progress. A local memory device, such as a CD-ROM drive, provides information to the computer for its use in showing promotional displays on the video monitor to attract potential customers to the machine. Alternatively, promotional information, including images, text, and audio, could be transmitted to the machine over a telecommunications link including the modem whereby updated advertising promotional material as well as information for printing on the card blanks such as the status of ongoing or recently completed sports or other events are available for display by the machine. In an alternative embodiment, the card blanks are blank on both sides and options for an image to be printed on a first side of the card blank are offered to the customer.

Accordingly, an object of the invention is to provide a printing and dispensing device for sports cards that prints and dispenses on demand souvenir sports cards.

A further object of the invention is to provide a sports card printing and dispensing device that interacts with a customer to print and dispense a souvenir sports card that contains information selected by the customer.

Another object of the invention is to provide a sports card printing and dispensing device that is operable to receive current information regarding ongoing sporting events and to print and dispense souvenir sports cards that contain information regarding ongoing or recently completed sporting events.

These and other objects of the invention will be made apparent upon a review of this specification, the associated drawings and the appended claims.

DETAILED DESCRIPTION OF A PREFERRED EMBODIMENT

Figure 1:
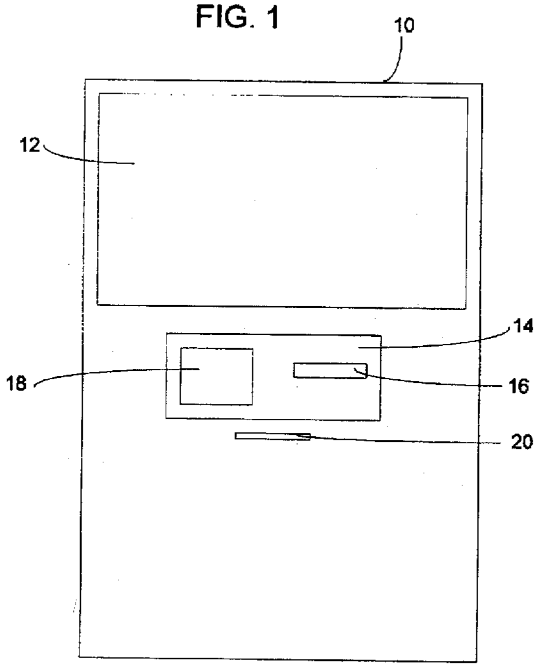
FIG. 1 is a front view of a sports card printing and dispensing device of the present invention.

Referring to FIG. 1, there is illustrated, generally at 10, a sports card printing and dispensing device consisting of a kiosk or vending machine that is preferably transportable to the locations of sporting events or other venues where customers of souvenir sports cards may be present. The sports card printing and dispensing device 10 includes a video monitor 12 on which promotional information, as well as information regarding the options of the sports card printing and dispensing device 10 and a particular transaction being undertaken, are displayed to a customer. A payment acceptor and card dispenser 14 includes a payment port 16 whereby paper currency or other forms of payment, such as credit cards, are submitted to the sports card printing and dispensing device 10 for payment for the sports card to be dispensed to the customer by the sports card printing and dispensing device 10. In the preferred embodiment, a customer interface is provided through a keypad 18. Alternatively, the video monitor 12 may include a touch-sensitive screen whereby control options available to the customer may be input into the sports card printing and dispensing device 10. A sports card printed by the sports card printing and dispensing device 10 is dispensed through the dispensing slot 20.

Figure 2:
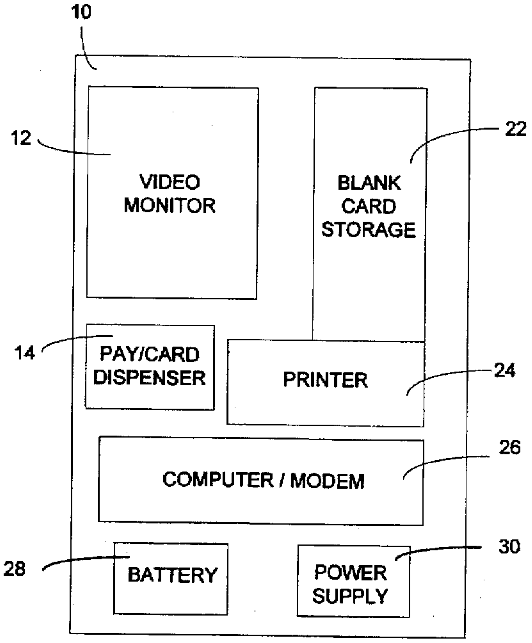
FIG. 2 is a schematic view of the main components of the sports card printing and dispensing device of the present invention.

The interior layout of the sports card printing and dispensing device 10 is shown schematically in FIG. 2. Operation of the sports card printing and dispensing device 10 is controlled by a computer and modem 26. An inventory of card blanks are held in a blank card storage hopper 22 from which the cards are fed to a printer 24. In the preferred embodiment, the sports card printing and dispensing device 10 includes a power supply 30 which is connected to a source of electrical power such as the usual 110 volt AC lines. A battery 28 is used both as a back-up for the line current and as an alternative electrical source.

Figure 3:
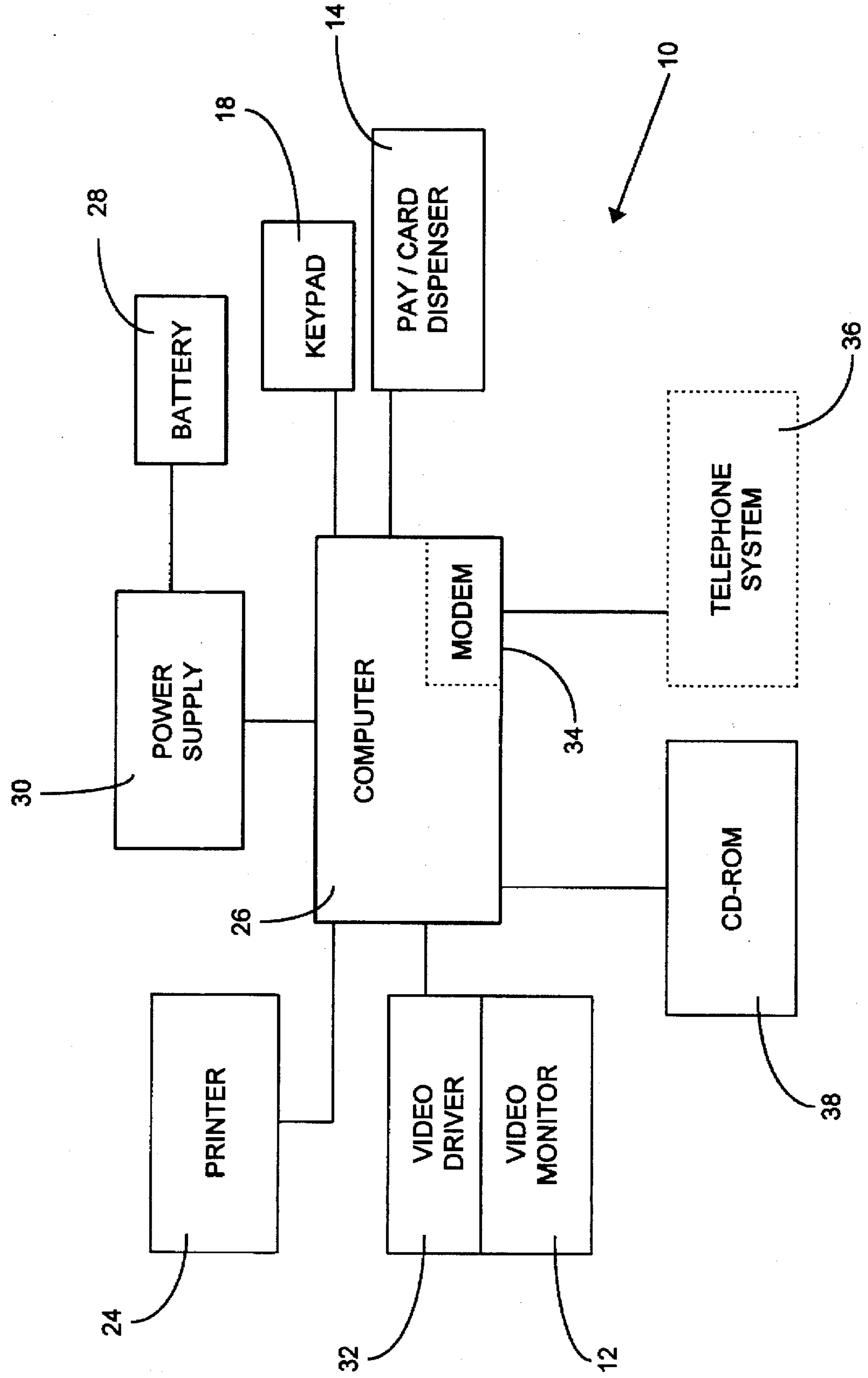
FIG. 3 is a block diagram of the sports card printing and dispensing device of the present invention.

As illustrated in FIG. 3, the sports card printing and dispensing device 10 further includes a video driver 32 interconnected between the computer 26 and the video monitor 12. A memory device, which in the preferred embodiment may be either a RAM memory device or a CD-ROM drive 38, serves as a repository and source of archived information and images pertaining to players or teams that may be selected by a customer. The CD-ROM drive 38 also provides information, which may include images, audio, and text, available for display on the video monitor 12 as a part of the customer interface and to attract potential customers to the sports card printing and dispensing device 10. A modem 34 is connected to the computer 26 and serves as a part of a data link between the computer 26 and outside databases. The modem 34 may either be directly connected to the telephone system 36 through a telephone cord or it may function as a cellular telephone modem whereby communications are done at radio frequencies and without any direct, hard-wired connection.

In operation, the sports card printing and dispensing device 10 is located at a sports stadium, sports arena, or other sporting venue where potential customers of sports cards may be present. When not in current use by a customer, the sports card printing and dispensing device 10 displays promotional information, including text, images, and audio, to attract new customers. The promotional information may include information regarding the current status of ongoing sporting events, scores and other statistics of recently completed sporting events, information such as maps and service guides of the sporting venue where the sports card printing and dispensing device 10 is located, advertisements of products and services of third-parties who have paid a fee to have the advertisements displayed on the sports card printing and dispensing device 10, and the like.

Information regarding the sporting events, such as the box scores and other game statistics, can be continuously updated through the modem 34 and telecommunications system 36. Updates to the promotional information can also be similarly provided to the sports card printing and dispensing device 10 so that the information and cards available from the device 10 remain current.

If a customer is attracted to the sports card printing and dispensing device 10, the customer would use the keypad 18 to follow the instructions for initiating a transaction which would be present and displayed either at all times or on a sufficiently frequent basis. After the transaction is initiated, the sports card printing and dispensing device 10 would primarily display information regarding features and options of the sports card printing and dispensing device 10 and the current status of the transaction. The computer 26 directs the customer through the transaction by displaying options on the video monitor 12. The customer selects from the available options by using the keypad 18 of the customer interface. In an alternative embodiment, the customer interface could include a touch-sensitive screen associated with the video monitor 12. During the transaction, it would be preferable to have an image of the sports card being selected by the customer displayed on the video monitor 12 substantially as it will appear upon being printed by the sports card printing and dispensing device 10.

Upon completion of all of the options for the particular card selected by the customer for printing by the sports card printing and dispensing device 10, the customer will be required to provide payment for the card to the sports card printing and dispensing device 10. Payment in the form of currency would be input to the sports card printing and dispensing device 10 through the payment slot 16. Alternatively, the sports card printing and dispensing device 10 could be configured to accept payment from credit or debit cards or the like by including a card swipe reader or similar device as a part of the payment acceptor and card dispenser 14. Verification of the credit or debit card would be possible by use of the modem 34 and the telecommunications link to access a remote database of such verification information. Although operation of the device has been described whereby payment for the card is not solicited until after the customer has completed the selection process, it may be desirable to have payment required shortly after a transaction is initiated. If demand for the cards is high, requiring payment early in the transaction process would ensure that less time was occupied by customers who ultimately decide not to purchase that card they were selecting.

Figure 4:
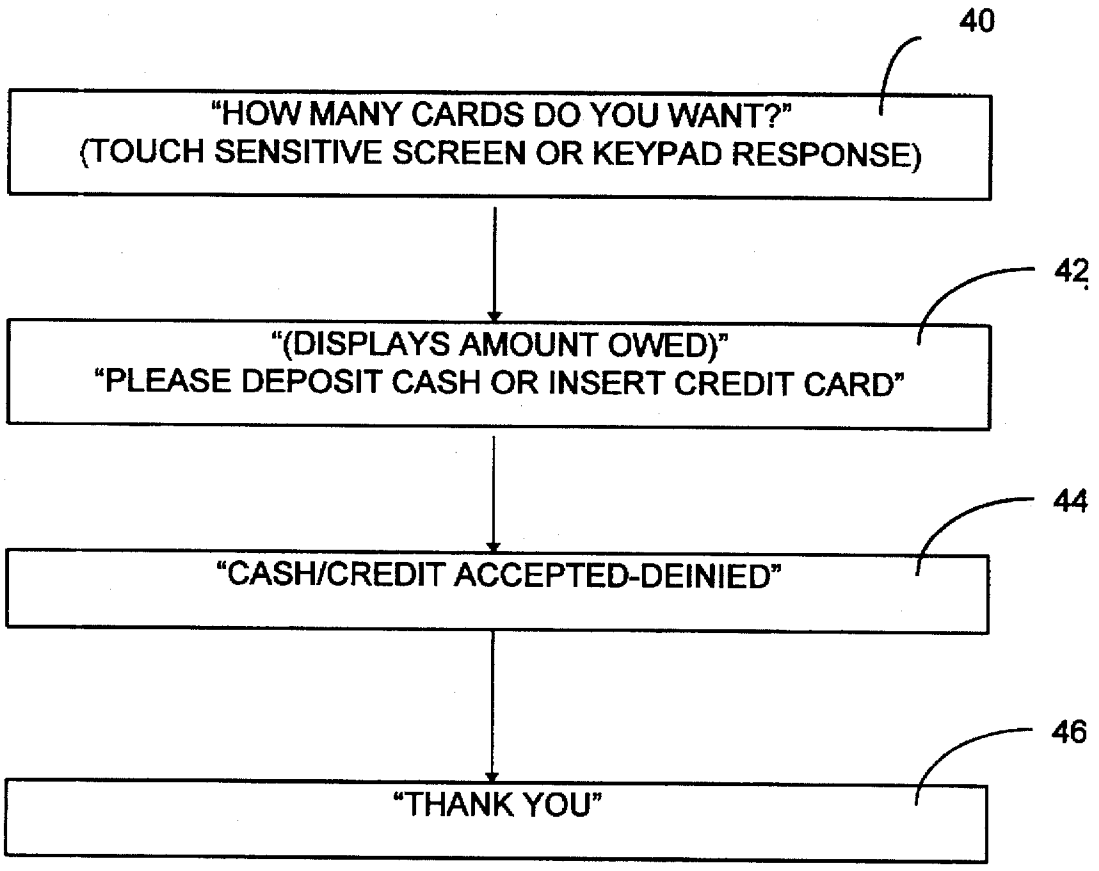
FIG. 4 is a sequence of sample screens of the operations in a first embodiment of the sports card printing and dispensing device of the present invention.
Figure 5:
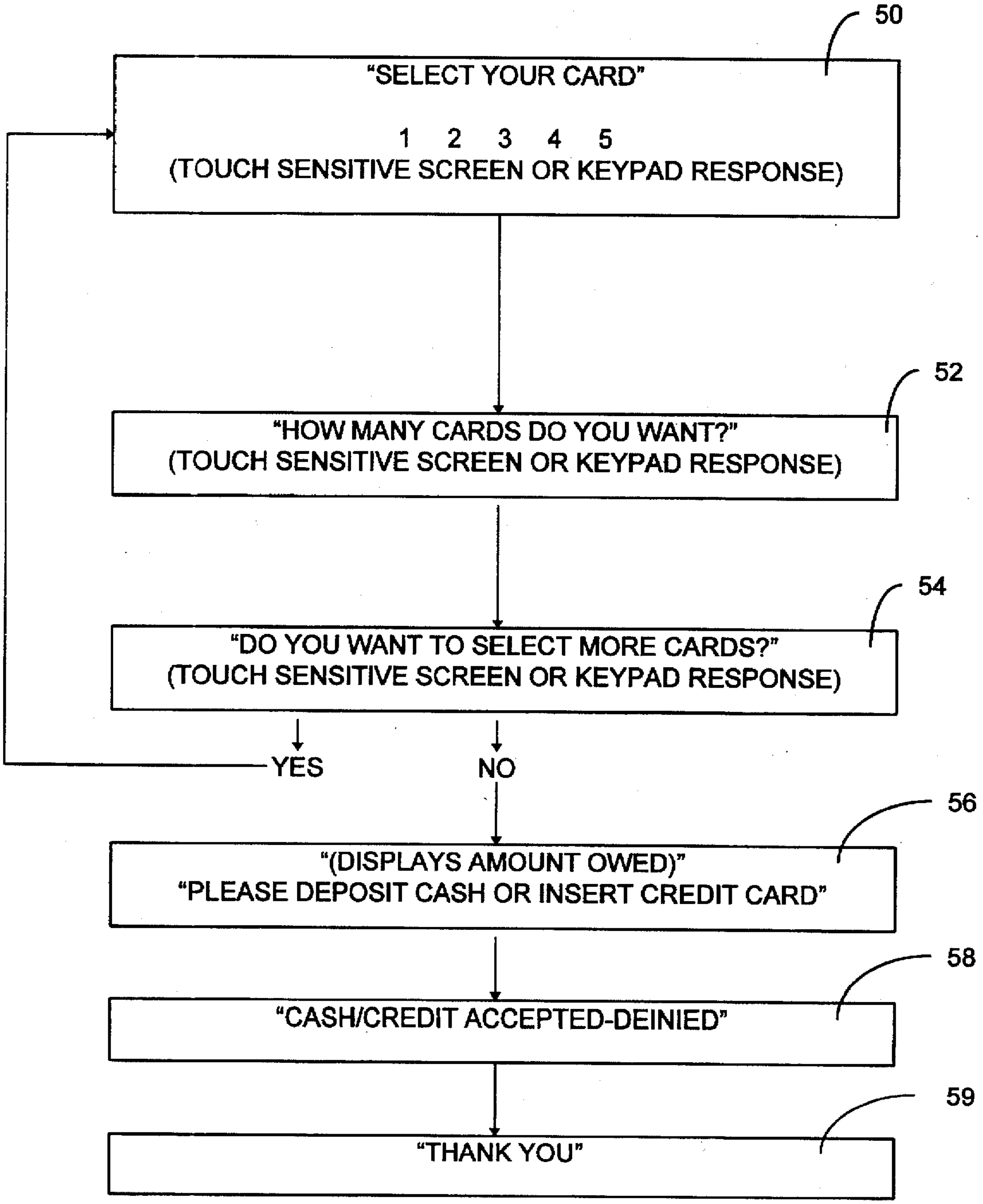
FIG. 5 is a sequence of sample screens of the operations in a second embodiment of the sports card printing and dispensing device of the present invention.
Figure 6:
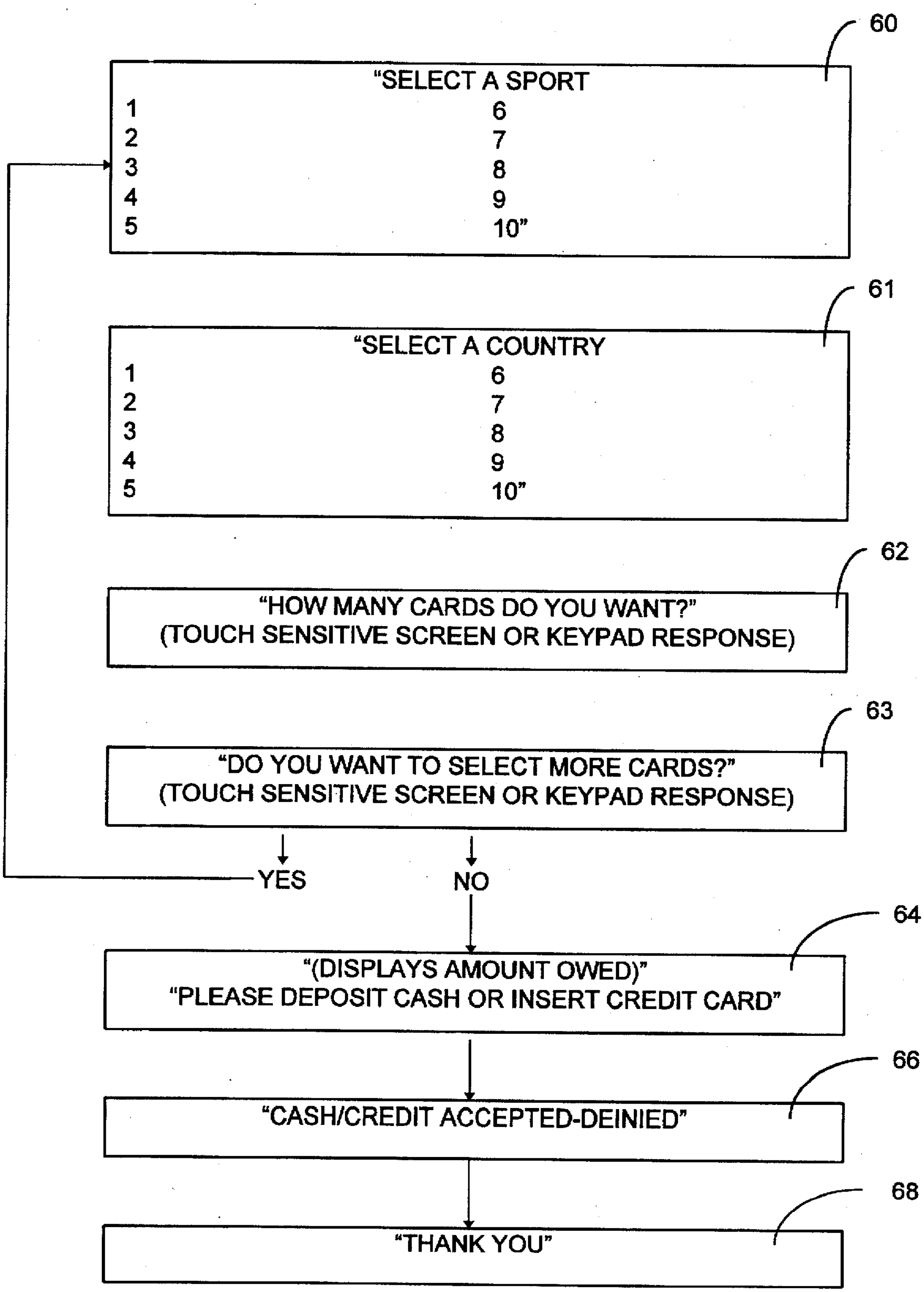
FIG. 6 is a sequence of sample screens of the operations in a third embodiment of the sports card printing and dispensing device of the present invention.

Sample screens of preferred embodiments of the invention are illustrated in FIGS. 4–6. Control options for input by the customer can either be entered on the keypad 18 or on the video monitor 12 if it has touch-sensitive capability. In a simple example, only a single, pre-printed card face is available for printing and dispensing. The first screen 40 asks the customer how many cards are desired (FIG. 4). The customer selects the desired number from the customer interface. The computer 26 calculates the cost of the cards selected and displays the amount on the second screen 42 together with a payment request. Notice of the acceptance or denial of payment is made at screen three 44, followed by a "Thank You" on the fourth screen 46. The computer 26 will then control the priming and dispensing of the selected card or cards and then return to the display of the first screen 40.

In a second embodiment, a plurality of pre-printed card blanks are available for selection by the customer wherein the face of the card blank has been pre-printed with an image, text or both corresponding to the sporting event that is ongoing or just recently completed at the sporting venue where the sports card priming and dispensing device 10 is located. In the example illustrated in FIG. 5, there is a selection of five pre-printed card faces available. The first screen 50 asks the customer to select from the available options of the card faces. A facsimile of each of the available card faces can be displayed for review by the customer. Once the customer has selected the desired card face, a second screen 52 asks how many of the selected cards are desired. At a third screen 54, the customer is asked whether any other cards, presumably of a different card face, are desired. If the response is "Yes," the computer 26 returns to the first screen 50. If the response is "No," a fourth screen 56 is displayed which shows the customer the amount of payment needed for the selected cards. The customer is then notified at a fifth screen 58 whether payment has been accepted or denied. If the payment has been accepted, the selected cards are printed and dispensed. A final "Thank You" screen 59 is displayed and the computer 26 will then return to the display of the first screen 50.

In a third embodiment, suitable for use at a sporting venue where more than a single event is taking place, a first screen 60 displays a selection of the different sporting events taking place at the venue and available for printing and dispensing by the device 10 (FIG. 6). Once a sport is selected, a second screen 61 is displayed to give the customer another level of control options. In the illustrated example, after the sport is selected, a list of options of countries is displayed, suitable, for example, at the venue of the Olympic Games. Because of the wide variety of optional card faces that are made available for selection by a customer in this third embodiment, it may be difficult to provide pre-printed card faces for all of the options. The image and other information for each of the card face options may either be stored on a storage device in the device 10 and connected to the computer 26 or may be stored at a remote database and accessible by the computer 26 through the modem 34 and the telecommunications system 36. After selection of the desired country, the customer is asked at a third screen 62 how many of the cards are wanted. The customer is then asked at a fourth screen 63 whether any other cards are desired. If the response is "Yes," the computer 26 returns to the first screen 60. If the response is "No," a fifth screen 64 is displayed which shows the customer the amount of payment needed for the selected cards. The customer is then notified at a sixth screen 66 whether payment has been accepted or denied. If the payment has been accepted, the selected cards are printed and dispensed. A final "Thank You" screen 68 is displayed and the computer 26 will then return to the display of the first screen 60.

In the preferred embodiment, the blank cards are pre-printed on one side with images, designs, or text, or combinations of any or all of these, unique to the sporting venue and home team where the sports card printing and dispensing device 10 is located. A wide variety of pre-printed card faces are made available for selection by a customer and each would be stored on the memory device for recall and display on the video monitor 12. It may be desirable in certain circumstances to also make available card faces of other teams, for example the opposing team for a particular event, to provide an option for customers who may not be fans of the home team. As discussed above, an alternative to using card blanks with pre-printed card faces is to provide printer 24 in the device 10 that is capable of not only printing text but also can print images and preferably color images on the face of card blanks that are not pre-printed. A selection of optional images may either be stored on a local memory device or may be made available via the modem 34 and telecommunications system 36. Of course, the modem 34 and telecommunications system 36 can be used to transfer information, including images for printing on the card faces, to the local memory device. In the same way, the information and images stored at the local memory device may be continuously updated to stay abreast of the ongoing sporting event or events.

One option that may be made available for printing on a card face is an image or images taken from the ongoing or recently completed sporting event. Either a video camera or a digital still camera can be used to capture and digitize an image of, for example, a particularly exciting or memorable aspect of the sporting event. The image may then be processed using known techniques and made available to the device 10 for printing on a face of a card blank.

Although the invention has been described in this detailed description as applicable to a sporting venue where a single home team plays, its applicability is much broader. For example, the sports card printing and dispensing device 10 would be applicable at sporting venue where there is no "home team" such as the Super Bowl or a tennis tournament. The sports card printing and dispensing device 10 is also ideally suited for placement at the site of the Olympic Games. Of course, the pre-printed card faces would be adapted for suitability to the particular sporting venue and event being serviced by the sports card printing and dispensing device 10.

Although the invention has been described with respect to a preferred embodiment thereof, it is to be also understood that it is not to be so limited since changes and modifications can be made therein which are within the full intended scope of this invention as defined by the appended claims.

I claim:

1. A card printing and dispensing device located at a venue of an entertainment event and operable by an operator, comprising:

(a) control means;

(b) an operator interface in communication with said control means for displaying control options to the operator and for accepting control instructions from the operator;

(c) a source of information regarding events that occurred during an ongoing or recently completed entertainment event, said information being updated as said entertainment event progresses and said information being independent of said control instructions accepted from the operator;

(d) a supply of card blanks;

(e) a printer in communication with said control means, for receiving said card blanks from said supply of card blanks, and for printing a subset of said information regarding the ongoing or recently completed entertainment event on said card blanks to create a printed card having independent and enduring value memorializing said subset of said information regarding the entertainment event; and (f) dispenser means for receiving said printed card from said printer and for dispensing said printed card to the operator for subsequent sale.

2. A card printing and dispensing device of claim 1, wherein said interface includes a video display screen.

3. A card printing and dispensing device of claim 1, wherein said interface includes a keypad.

4. A card priming and dispensing device of claim 1, wherein said control means includes a digital computer.

5. A card printing and dispensing device of claim 1, wherein said control means includes means for communicating with said source of information.

6. A card printing and dispensing device of claim 5, wherein said communication means includes a modem and telephone lines.

7. A card printing and dispensing device of claim 5, wherein said source of information includes a local memory device in communication with said control means.

8. A card printing and dispensing device of claim 6, wherein said source of information includes a remote database accessible by said modem over said telephone lines.

9. A card printing and dispensing device of claim 1, wherein said card blanks are pre-printed on a first side with an image that corresponds to the entertainment event and wherein said printer prints said information on a second, blank side of said card blank.

10. A card printing and dispensing device of claim 1, wherein said card blanks are blank on both sides and wherein said control options includes a selection of images corresponding to the entertainment event for selection by the operator for printing on a first side of said card blank.

11. A card printing and dispensing device of claim 10, wherein said printer prints said information on a second, blank side of said card blank.

12. A card printing and dispensing device of claim 10, wherein said selection of images includes images of the entertainment event.

13. A customer-operated sports card printing and dispensing device located at a venue of a sporting event, comprising:

(a) control means;

(b) a customer interface in communication with said control means for displaying control options to the customer and for accepting control instructions from the customer;

(c) a source of information regarding events that occurred during an ongoing or recently completed sporting event taking place at the sporting event venue, said information being updated as said sporting event progresses and said information being independent of said control instructions accepted from the customer;

(d) a supply of card blanks;

(e) a printer in communication with said control means, for receiving said card blanks from said supply of card blanks, and for printing a subset of said information regarding the ongoing or recently completed sporting event on said card blanks to create a printed card having independent and enduring value memorializing said subset of said information regarding the sporting event;

(f) means for accepting payment for a printed sports card; and (g) dispenser means for receiving said printed sports card from said printer and for dispensing said printed sports card to the customer.

14. A customer-operated sports card printing and dispensing device located at a venue of a sporting event, comprising:

(a) control means including a digital computer and a modem for connection to a remote database over a telephone line;

(b) a customer interface in communication with said control means for displaying on a video monitor control options to the customer and for accepting control instructions from the customer;

(c) a source of information regarding events that occurred during an ongoing or recently completed sporting event taking place at the sporting event venue, said information being updated as said sporting event progresses and said information being independent of said control instructions accepted from the customer;

(d) a supply of card blanks;

(e) a printer in communication with said control means, for receiving said card blanks from said supply of card blanks, and for printing a subset of said information regarding the ongoing or recently completed sporting event on said card blanks to create a printed card having independent and enduring value memorializing said subset of said information regarding the sporting event;

(f) means for accepting payment for a printed sports card; and (g) dispenser means for receiving said printed sports card from said printer and for dispensing said printed sports card to the customer.

15. A card printing and dispensing device of claim 14, wherein said control means includes a digital computer.

16. A card printing and dispensing device of claim 15, wherein said source of information includes a local memory device in communication with said control means.

17. A card printing and dispensing device of claim 14, wherein said card blanks are pre-printed on a first side with an image that corresponds to the sporting event and wherein said printer prints said information on a second, blank side of said card blank.

18. A card printing and dispensing device of claim 14, wherein said card blanks are blank on both sides and wherein said control options include a selection of images corresponding to the sporting event for selection by the customer for printing on a first side of said card blank.

19. A card printing and dispensing device of claim 18, wherein said printer prints said information on a second, blank side of said card blank.

20. A card printing and dispensing device of claim 18, wherein said selection of images includes images of the sporting event.

21. A card printing and dispensing device of claim 14, wherein said sporting event is a baseball game.

22. A method controlled by an operator for printing and dispensing a card from a printing and dispensing device located at a venue of an entertainment event, comprising the steps of:

(a) displaying to the operator on an operator interface of the printing and dispensing device a choice of control options;

(b) communicating control options accepted by the operator from said operator interface to a control means of the printing and dispensing device;

(c) accessing by said control means a source of information regarding events that occurred during an ongoing or recently completed entertainment event, said information being independent of said control instructions accepted by the operator;

(d) updating said information as the entertainment event progresses and clearing said information a predetermined time after the entertainment event is completed to prevent the creation of cards pertaining to the entertainment event after said information is cleared;

(e) communicating a subset of said information, as it exists at the time the operator is accepting said control options and corresponding to said control options accepted by the operator, from said control means to a printer;

(f) receiving a card blank from a supply of card blanks and printing said subset of information on said card blank to create a printed card having independent and enduring value memorializing said subset of information regarding the entertainment event; and (g) dispensing said printed card to the operator for subsequent sale.

23. A method as defined in claim 20, wherein said control means includes a digital computer.

24. A method as defined in claim 23, wherein said updating of information includes communication of information from a remote location to said source of information by modem and telephone line.

25. A method as defined in claim 24, wherein said source of information includes a remote database accessible by said modem over said telephone lines.

26. A method as defined in claim 22, wherein said source of information includes an image of a selected moment of the entertainment event.

27. A method controlled by a spectator for printing and dispensing a souvenir baseball card from a printing and dispensing device located at a baseball park where a baseball game is being played or has just been completed, comprising the steps of:

(a) displaying to the spectator on an operator interface of the printing and dispensing device a choice of control options;

(b) communicating control options accepted by the spectator from said operator interface to a control means of the printing and dispensing device;

(c) accessing by said control means a source of information regarding events that occurred during the ongoing or recently completed baseball game, said information including a summary of statistics or images pertaining to the baseball game and being independent of said control instructions accepted by the spectator;

(d) updating said information as each inning of the baseball game is completed and clearing said information when the baseball park is closed after completion of the baseball game to prevent the creation of baseball cards pertaining to the said baseball game event after said information is cleared;

(e) communicating a subset of said information, as it exists at the time the spectator is accepting said control options and corresponding to said control options accepted by the spectator, from said control means to a printer;

(f) receiving a card blank from a supply of card blanks and printing said subset of information on said card blank to create a souvenir baseball card having independent and enduring value memorializing said subset of information regarding the said baseball game; and (g) dispensing said souvenir baseball card to the operator for subsequent sale.

* * * * *